United States Patent [19]

Fan

[11] 4,395,426

[45] Jul. 26, 1983

[54] DRY MIX FOR BREAD

[75] Inventor: Steve T. Fan, Maple Grove, Minn.

[73] Assignee: General Mills, Inc., Minneapolis, Minn.

[21] Appl. No.: 287,457

[22] Filed: Jul. 27, 1981

[51] Int. Cl.$^3$ .............................................. A21D 10/00
[52] U.S. Cl. ........................................ 426/62; 426/19; 426/555
[58] Field of Search ....................... 426/19, 21, 23, 24 426/26, 62, 551-555, 561, 653-654, 804, 549, 576, 578, 583, 581, 575

[56]  References Cited

U.S. PATENT DOCUMENTS 3,271,164  9/1966  Andt ...................................... 426/24
3,615,680 10/1971  Henika et al. .......................... 426/23

FOREIGN PATENT DOCUMENTS 674910 11/1963  Canada ................................ 426/551

Primary Examiner—Raymond N. Jones
Assistant Examiner—Elizabeth A. Hatcher
Attorney, Agent, or Firm—Gene O. Enockson; John A. O'Toole

[57] ABSTRACT

Disclosed are dry mixes for the preparation of baked goods having yeasty flavor that do not require dough kneading or lengthy fermentation steps. Such mixes comprise flour, chemical leavening agents, active dry yeast, and a selected gum mixture comprising propylene glycol alginate, and a member selected from the group consisting of karaya gum, guar gum, xanthan gum, carboxymethyl cellulose, carregeenan gum, and mixtures thereof. Baked goods prepared from doughs made from the dry mixes herein require no kneading step. After a shortened fermentation step, the doughs can be baked in a conventional manner. The resultant baked goods are characterized by high specific volume and a bread-like consistency and texture.

7 Claims, No Drawings

DRY MIX FOR BREAD

BACKGROUND OF THE INVENTION

1. Field of the Invention

The present invention relates to food products useful for the provision of baked goods. More particularly, the present invention relates to farinaceous dry mixes useful in the preparation of yeasty baked goods.

2. The Prior Art

Conventional home baking methods employing scratch ingredients call for a series of tedious and time consuming dough working and fermentation steps, each of which are essential to the provision of baked goods exhibiting desirable yeasty flavor and texture attributes. By way of illustration, in one cookbook procedure for making bread, the dough ingredients are first mixed in a bowl; kneaded on a dough board (at least 10 minutes); placed in a bowl and allowed to rise about one hour (early proof) until the volume has doubled; punched, rolled, folded (2 to 3 minutes); placed in a bowl and allowed to rise another $1$-$1\frac{1}{2}$ hours (intermediate proof) until the volume has doubled again; hand shaped and divided to form units for baking; and next placed into pans and allowed to rise for another 30 minutes (final proofing) to double the volume. The dough is then baked and cooled. Altogether, such processes require from $3\frac{1}{2}$ to 5 hours, or more, to complete. Even in processes described for so called "quick" yeasty breads in popular cookbooks, a minimum of $2\frac{1}{2}$ to 3 hours is still required to complete the various steps. Accordingly, there is a distinct need for food products which can provide yeasty baked goods that do not require traditional, odious home baking methods.

Yeast leavened baked goods are desirably distinguished from typical chemically leavened goods by both flavor and texture differences which are generally referred to herein by the term "yeasty." Thus, yeasty baked goods have a bread-like yeast flavor and a bread-like texture. In contrast, typical chemically leavened baked goods are generally characterized by an absence of yeasty flavor and a distinctly different texture and structure, generally referred to as "cake-like." Since the yeasty flavor results in large measure due to the action of the yeast during the fermentation or proofing step and since the yeasty texture results primarily from the kneading step, minimization of the number and length of steps involved in yeasty goods production, particularly fermentation steps and kneading steps, are at odds with desirably providing both yeasty flavor and yeasty texture.

Notwithstanding these difficulties, the prior art includes many attempts at providing such food products. Past art attempts have taken generally one of two tacts: (1) provision of products allowing reduction in fermentation step times, or (2) provision of products allowing elimination altogether of the lengthy fermentation step. The first tact that past art attempts have taken to provide both desirable yeasty flavor and yeasty texture is to provide products requiring only reduced fermentation times. Such attempts to reduce required fermentation or "proofing" times include, for example, U.S. Pat. No. 3,617,305 (issued Nov. 2, 1971 to J. R. Rolland) which teaches reduction of bread preparation time by providing doughs incorporating an ascorbate compound, an oxidizing agent, and a sulfhydryl reducing agent. U.S. Pat. No. 3,309,203 (issued Mar. 14, 1967 to C. J. Jenson) teaches fermentation time reduction by dough mixes containing added methionine. U.S. Pat. No. 3,510,312 (issued May 5, 1972 to H. Rupprecht and L. Popp) teaches the addition of active yeast, carbohydrates, and yeast nutrients to doughs to provide fermentation time reduction benefits.

Past art efforts have also taken the second tact, i.e., achieving a yeast-like leavened baked goods texture without yeast fermentation. See, for example, U.S. Pat. No. 3,897,568 (issued July 29, 1975 to J. A. Johnson), U.S. Pat. No. 3,170,795 (issued Feb. 23, 1965 to A. A. Andre), and U.S. Pat. No. 3,167,432 (issued Jan. 26, 1965 to E. E. Colby). U.S. Pat. No. 3,897,568 (issued July 29, 1975) teaches the addition of hydrolyzed wheat gluten, acetic and lactic acids, and $C_4$-$C_8$ monocarboxylic acids to doughs as fermentation compensators. Generally, these patents disclose dough compositions which are chemically leavened and which contain extra, texture modifying ingredients in order to simulate the texture of yeast leavened baked goods.

Given the state of the art for dough mixes for yeasty baked goods as described above, there is a continuing need for new and useful dough mixes for the provision of yeasty baked goods that do not require dough working and extended fermentation steps by the consumer. Accordingly, it is an object of the present invention to provide dry dough mixes useful in the provision of yeasty baked goods.

It is a further object of the present invention to provide dry dough mixes which can be used to prepare yeasty baked goods in as little as 30 minutes, said dry dough mixes therefore being referred to herein as "convenience yeast dough mixes."

It is a further object of the present invention to provide dry dough mixes for the preparation of yeasted baked goods exhibiting desirably greater specific volumes.

It has been surprisingly discovered that the above objectives can be realized and superior dry dough mixes provided by formulating a dry mix comprising flour, active dry yeast, a chemical leavening agent, and a gum mixture consisting essentially of propylene glycol alginate and a member selected from the group consisting of karaya gum, guar gum, carrageenan, xanthan gum, carboxymethyl cellulose and mixtures thereof.

SUMMARY OF THE INVENTION

The present invention relates to dry mixes which are useful in the provision of yeasty baked goods without undergoing dough working or lengthy dough fermentation steps. Such mixes comprise flour having an average vital gluten content of at least about 8% by weight. The mix additionally essentially comprises from about 2 parts to 10 parts by weight of active dry yeast. A chemical leavening agent is essentially present in the dry mixes at from about 3 parts to 12 parts by weight. A selected gum mixture comprising propylene glycol alginate at from 0.5 to 1.5 parts by weight and a second gum selected from the group consisting of gum karaya, guar gum, xanthan gum, carboxymethyl cellulose, carrageenan, and mixtures thereof is essentially present at from about 2 parts to 5 parts by weight of the dry mix. The gum mixture provides finished baked goods with both desirable high specific volume and a yeasty-like bread texture. Baked goods prepared from those made from the dry mixes herein require no kneading or dough working step. After a shortened fermentation step, the dough can be baked in a conventional manner.

DETAILED DESCRIPTION OF THE INVENTION

The present invention relates to dry dough mixes having as essential ingredients (a) flour, (b) active dry yeast, (c) chemical leavening agent, and (d) a specific gum mixture. Each of these essential ingredients as well as product preparation and use are described in detail below.

Throughout the specification and claims, percentages are by weight and temperatures are in degrees Fahrenheit unless otherwise indicated.

A. Flour

The main ingredient of the present dry dough mixes is conventional flour. Suitable flours are those conventionally employed in the preparation of yeast leavened baked goods and selection of appropriate flours pose no problems for the skilled artisan. Such suitable flours are broadly derived from cereal grains such as wheat, rye, oats, barley, corn, and the like. The gluten or protein content of the flour can vary within normal ranges, e.g., 5% to 15%. Even lower protein content flours can be used in part if the vital gluten content averages at least 5%. For the production of bread from the present mixes, flour with the higher gluten content is preferred, or the vital gluten content of a flour employed can be fortified by addition of vital gluten to bring the total gluten content of the aggregate flour to form about 10% to about 15% of above. Of course, various mixtures of flours can be employed, e.g., multi-grain mixtures of oat flour, wheat flour, barley flour, rye flour, and the like.

B. Active Yeast Component

Active dry yeast is an essential component of the present dry mixes for bread dough. As is conventional in the baking industry, the amount of additional ingredients in a dough is expressed based upon 100 parts of flour. Thus, the present dry mixes essentially contain from about 2 to 10 parts of active dry yeast per 100 parts of flour, preferably from about 4 to 6 parts.

Active dry yeast is a common, commercially available material and the skilled artisan should have no problem selecting suitable active dry yeast materials for use herein. Generally, active dry yeast (e.g., Saccharomyces cerevisial) are prepared by drying fresh compressed yeast with a drying gas flow such as in a fluidized bed. A more detailed description of active dry yeast as well as methods for its preparation is given in U.S. Pat. No. 4,081,558 (issued Mar. 28, 1978 to F. S. Grylls et al.), U.S. Pat. No. 3,993,783 (issued Nov. 23, 1976 to A. Langejan et al.), U.S. Pat. No. 3,843,800 (issued Oct. 22, 1974 to A. Langejan), and U.S. Pat. No. 3,615,685 (issued Oct. 26, 1971 to E. Fantozzi et al.) each of which are incorporated herein by reference.

C. Gum Mixture

A selected mixture of gums is an essential component of the present compositions. The gum system comprises a first member comprising propylene glycol alginate ("PGA") and a second member selected from the group consisting of karaya gum, guar gum, xanthan gum, carboxymethyl cellulose, carrageenan gum, and mixtures thereof. The propylene glycol alginate is essentially present at least about 0.5 parts per 100 parts flour to about 1.5 parts. The second gum member is essentially present at from about 2 parts to 10 parts per 100 parts flour. Preferably, the PGA is present at from about 0.8 to 1.2 parts per 100 parts flour. The second member preferably is present at from about 2–5 parts.

The particular gum mixture has surprisingly allowed for provision of yeasty baked goods of desirably high specific volume and desirable bread-like texture without requiring odious dough kneading steps. Without proper dough development resulting from dough kneading, finished baked goods generally exhibit low specific volumes, i.e., less than about 5 cc./g. of mix (i.e., the volume of finished baked goods per unit weight of dry mix, e.g., cc./g.) typically measured by a standard rapeseed oil displacement test. Such low specific volumes are generally not improved significantly by higher levels of chemical leavening agents.

Finished baked goods are additionally characterized by having a desirable bread-like texture. While in the past such a texture has been measured only by sensory evaluation, instrumentation and test methodology have been developed recently to measure food texture (see, for example, *Food Technology*, Vol. 32, No. 7, pg. 62, 1978 entitled "Texture Profile Analysis" by M. C. Bourne). Baked goods texture differences are expressed by a "cohesiveness" value ranging between 0.0 to 1.0. Bread identified as having good texture always has a cohesiveness value ranging between 0.62 to 0.70. Below about 0.62, baked goods' texture becomes increasingly undesirably crumbly. For bread above a cohesiveness value of 0.70, the texture becomes increasingly undesirably rubbery.

Unfortunately, while some gums or combinations thereof when added to the other essential ingredients of the present dry mixes provide finished baked goods of desired higher specific volumes, i.e., greater than about 5.0. cc./g., these gums do not sufficiently improve the bread texture to the desirable cohesiveness range of 0.62 to 0.70.

Thus, it has been surprisingly discovered that the particular gum system of the present invention enables the realization of dry mixes which upon dough preparation and baking—without dough kneading—yield finished baked goods characterized by high specific volumes, i.e., greater than about 5 cc./g. More surprisingly, the particular gum system also enables the realization of dry mixes which yield finished baked goods additionally characterized by having a texture cohesiveness value ranging between 0.62 and 0.70.

Each of the gums which comprise the present gum mixture are well known in the food art and the skilled artisan will have no problem selecting suitable gum grades from those commercially available. Each of these gums is described in detail, in for example, "Industrial Gums: Polysaccharides and their Derivatives," second ed., ed. by Roy L. Whistler, Academic Press, (1973) which is incorporated herein by reference. See also "Encyclopedia of Food Science," ed. by M. S. Peterson and A. H. Johnson, Avi Publishing Co. (1978).

As described in "Industrial Gums," propylene glycol alginate is prepared by reacting propylene oxide under moderate pressure with a partially neutralized alginic acid which is in a fibrous condition because of the presence of a controlled amount of water. Alginic acid is prepared from acidified algin which is recovered from washing and alkali digesting of kelp. Any propylene glycol alginate ("PGA") is suitable for use herein. However, powdered PGA (i.e., through a 100 U.S. Standard size mesh) is preferred to agglomerated PGA. In general, gum karaya is the name given to the dried exudation of the *Sterulia urens* tree common in India and has in the past been referred to as "Sterculia gum." Guar gum is finely ground endosperm of the seed of the guar plant, *Cyanaposis tetragonolabus,* a pod-bearing, nitrogen fixing legume crop grown in Texas. Xanthan gum is produced by fermentation by the bacteria, *Xanthomonas campestus.* Carboxymethyl cellulose is derived from alkali cellulose which has been treated with sodium monochloroacetate. The properties of CMC depend upon (1) the degree of substitution (D. S.) and (2) the degree of polymerization (D. P.). The D. S. is the number of hydroxyl groups on each anhydroglucose unit which is substituted by the carboxymethyl group. D. S. values of commercial samples usually range between 0.4–1.2 with food groups D. S. values no greater than 0.9. D. P. values range from about 500 to 2,000 for most commercial types. High viscosity CMC is preferred for use herein and is generally defined and is used herein to refer to any CMC which at 2% aqueous dispersion at a pH between 5 to 11 has a viscosity exceeding about 40,000 cp.

Carrageenan is an anionic, sulfated polysaccharide obtained from red algae. High viscosity carrageenan is preferred for use herein and is generally characterized as lamda carrageenan. The high viscosity carrageenan can be supplied by substantially pure lamda carrageenan or from carrageenan mixtures based on amounts of lamda carrageenan.

The second gum member is preferably selected from the group consisting of (1) karaya gum, (2) carboxymethyl cellulose, (3) guar gum, and mixtures thereof. The most preferred second gum is an equal mixture of gum karaya, guar gum and CMC.

D. Chemical Leavening Agent

Another essential ingredient of the present dough mixes is a conventional chemical leavening agent. The chemical leavening comprises from about 3 parts to 12 parts of the present dough mixes per 100 parts flour, preferably from about 1 to 12 parts. Chemical leavening agents are needed since a fermentation step is not required in the preparation of baked goods from the present dough mixes.

The selection of a suitable chemical leavening agent or system from those known in the art will pose no problem for one skilled in the formulation of culinary dry mixes for baked goods. In general, such suitable systems are composed of a baking soda, e.g., sodium, potassium, or ammonium bicarbonate, etc., as a source of carbon dioxide on one hand, and one or more other common baking acids on the other. Suitable baking acids include sodium aluminum phosphate, anhydrous monocalcium phosphate, monocalcium pyrophosphate, glucono-delta-lactone, and mixtures thereof. The preferred chemical leavening system for use in the present dry mixes includes any baking soda and a mixture of various sizes of a single baking acid, i.e., a double acting leavening system. By varying the particle size of the acid, the rate and temperature at which the leavening is generated can be controlled in the conventional manner. A multiple acid system can comprise baking acid mixtures comprising a first, slow-reacting baking acid selected from the group consisting of dicalcium phosphate dehydrate, sodium aluminum sulfate, glucono-delta-lactone, and mixtures thereof, and a second, fast-reacting baking acid selected from the group consisting of monocalcium phosphate monohydrate, sodium acid pyrophosphate and potassium acid tartrate, and mixtures thereof. In the preferred embodiment, the weight ratio of the first baking acid to the second baking acid is about 0.75:1 to 1.25:1.

ADDITIONAL DRY DOUGH MIX INGREDIENTS

As noted supra, preferred embodiments of the present dry dough mixes can contain a variety of optional ingredients.

Nutritive Carbohydrate Sweetening Agent

One optional component of preferred embodiments of the present dry dough mix compositions is a nutritive carbohydrate sweetening agent or "sugar." If present, such nutritive carbohydrate sweetening agents or sugar can comprise from about 1 part to 15 parts, preferably from about 2 parts to 7 parts, and most preferably from about 4 parts to 7 parts by weight of the dough mix composition. The term "nutritive carbohydrate sweetening agent" is used herein to mean those typical sweetening agents conventionally used in food products.

High levels of sweetening agents are generally to be avoided; however, high sweetening agent levels can exert a tenderizing effect upon finished baked goods texture undesirably reducing the elasticity of the presently finished yeasty baked goods. Thus, sweetening agent levels exceeding 10 parts per 100 parts flour, i.e., a sugar to flour ratio exceeding about 0.1 is to be avoided.

Suitable materials for the nutritive carbohydrate sweetening agent herein are well known in the art. Examples of such sweetening agents include both monosaccharide and dissaccharide sugars such as sucrose, invert sugar, dextrose, lactose, honey, maltose, fructose, maple syrup, and corn syrup solids. Preferred nutritive carbohydrate sweetening agents are selected from the group consisting of sucrose, dextrose and corn syrup solids. Sucrose is the most preferred sweetening agent for use herein.

Non-Fat Dry Milk Solids

Another optional component of the preferred embodiments of the present dry dough mixes is "high heat" non-fat dry milk solids. "High heat" milk is conventionally employed in yeasty baked goods and is well known in the art. Generally, "high heat" milk is that which has been subjected to high temperature—compared to normal pasteurization temperatures—prior to drying so as to partially denature the milk proteins. High heat NFDM solids are desirably added to the present dry dough mixes to improve dough mix/water mixing times, to permit the use of more water, and to speed the crust coloring of the baked goods and thus to decrease baking times. If present, NFDM solids can comprise from about 1 part to 10 parts by weight of the dough mixes. Of course, it is to be appreciated that if NFDM solids were added to the kneaded dough as described above, then the above ranges for the NFDM solids would include the contribution therefrom. For better results, the total NFDM solids can comprise from about 1 part to 5 parts of the dry dough mixes. For best results, the total NFDM solids should comprise about 2 parts of the dough mixes. Other conventional substitutes, whey solids, caseinate, dried egg solids and soy powder or soy flour for the NFDM solids can be used in whole or in part for the NFDM solids' component.

Shortening

The present bread dough mixes can also optionally comprise from about 1 part to 10 parts of a shortening ingredient. Preferably, the present dry mix compositions comprise from about 1 part to about 3 parts of the shortening ingredient. Best results are obtained when the shortening component comprises from about 1 part to 2 parts of the present dough mix compositions. If present, maintenance of shortening concentrations within these limits is important for the realization of dough mixes in the form of free-flowing particles. Such concentrations are also advantageous in providing yeasty baked goods of improved textural quality.

Conventional shortening materials are suitable for use as the shortening ingredient of the present dough mixes. Such conventional shortening materials are well known in the culinary mix preparation art. Conventional shortenings useful herein are fatty glyceridic materials which can be classified on the basis of their physical state at room temperature. Liquid shortenings can be used in the present dough mix compositions and provide the advantage of ease with which the shortenings can be blended into the dough mixes. Solid shortening can also be used and provide the advantage of desirable mouthfeel upon finished baked goods consumption. More commonly, and preferred for use herein, mixtures of liquid and solid shortenings are used in dry mixes. Such mixes can be fluid or plastic depending in part upon the level of solid fatty materials. Shortenings of this type comprise a liquid oil containing from about 2% to 26% normally solid fatty glycerides. This is, a solids content index ("SCI") of 2% to 26% at 70° F. but only about 4% at 100° F.

The fatty glycerides can include fatty mono-, di-, and tri-glycerides of saturated or unsaturated fatty acids having about 12 to 22 carbon atoms. Suitable shortening materials can be of animal, vegetable, marine or synthetic oil origin. Suitable shortening materials can be derived from, for example, coconut oil, palm kernel oil, cottonseed oil, peanut oil, olive oil, sunflower seed oil, sesame seed oil, corn oil, safflower oil, poppy seed oil, soybean oil, rapeseed oil, babassu oil and the like. Other suitable shortening materials and methods of shortening preparation as described in detail in Bailey's "Industrial Oil and Fat Products," (3rd ed. 1964) which is incorporated herein by reference.

Conventionally, the shortening ingredient of dough mixes is emulsified. That is, the shortenings provide a convenient carrier for addition of emulsifiers to the dough mix. Such emulsifiers aid the realization of baked goods with improved grain structure and texture. Thus, certain embodiments of the present dough mixes can, if desired, contain conventional emulsifiers. The emulsifier typically comprises from about 1% to 16% of the shortening component, preferably from about 5% to about 15% and, most preferably from about 10% to 15%.

The exact amount of emulsifier used is determined by the particular emulsifier employed and specific desired finished yeasty baked goods attributes. The art is replete with emulsifiers which are suitable for inclusion in the shortening component for the provision of dough mixes for baked goods. Thus, selection of particular emulsifiers will pose no problems for the skilled artisan.

Partially esterified polyhydric compounds having surface active properties are exceptionally suitable for use herein as emulsifiers. This class of emulsifiers include among others, mono- and diglycerides of fatty acids, such as monopalmitin, monostearin, monoolein, and dipalmitin; partial fatty esters of glycols, such as propylene glycol monostearate and monobehenate; higher fatty acid esters of sugars, such as the partial palmitic and oleic acid esters of sucrose; and phosphoric and sulfuric acid esters, such as dodecyl glyceryl ether sulfate and monostearin phosphate. Other examples include the partial esters of hydroxy carboxylic acids, such as lactic, citric, and tartaric acids with polyhydric compounds, for example, glyceryl lactopalmitate, and the polyoxyethylene ethers of fatty esters of polyhydric alcohols, such as a polyoxyethylene ether of sorbitan monostearate or distearate. Fatty acids alone or esterified with a hydroxy carboxylic acid, e.g., stearyl-2-lactylate, are also useful.

MISCELLANEOUS OPTIONAL INGREDIENTS

A variety of optional ingredients can be added to the present bread mixes including flavors, colors, preservatives, vitamins and the like.

Dough Mix Composition Preparation

The dry bread dough mixes of the present invention are prepared by blending the essential and optional components together in any conventional manner such as to produce a free-flowing dry mix. In a preferred method of dough mix preparation, the flour, active dry yeast, the leavening agent, gum mixture, and any optional ingredients are blended in a ribbon blender for a period of about 8–20 minutes at a mix temperature below about 65° F. When a liquid oil is part of a shortening optional ingredient, then the oil is normally added during blending by means of an oil spray or by extruding the blend mixture through a spreader bar. Blending is continued after introduction of the oil until the oil lump count is from about 10% to 15% by weight on a Number 10 Standard sieve. Best results are obtained when the temperature of the mix after blending is from about 65° F. to 70° F.

In the preferred method of dough mix preparation, the dough mix is subsequently finished in a standard commerical finisher. Finishers are devices for reducing shortening lump size and for more intimately incorporating the shortening into a mix by impact mixing. Thus, finishing the mix in a finisher is highly preferred when the shortening component comprises a plastic shortening. Commercially available finishers generally include an exposure on which are mounted rapidly rotating blades. The present dough mixes are then packaged in a conventional manner in conventionally suitable containers which typically hold specific weights of the dough mix.

Dough Mix Composition Use

The present dough mixes are conveniently prepared into finished yeasty baked goods in a manner similar to cake mixes by forming a batter by mixing the dry dough mix with a household electric mixer, for example, two minutes at medium or high speed, or simply with a fork, after having added water or other aqueous liquid. If desired, fresh eggs can be added to the dough mix to impart flavor and provide a different texture. The batter resulting from the mixing process is transferred into a suitable baking pan, optionally, proofed up to about 10 min. and baked, for example, for 25 to 35 minutes at 175° C. to 230° C.

The following examples are offered to further illustrate the invention disclosed herein.

EXAMPLE I

A bread mix was prepared having the following formulation:

| Ingredients | Parts by weight |
| --- | --- |
| Wheat flour[1] | 100.0 |
| Active dry yeast | 5.0 |
| Non-fat dry milk | 2.0 |
| Sucrose | 6.0 |
| Gum Mixture | 3.6 |
| Propylene glycol alginate | 0.9 |
| Xanthan | 0.9 |
| Carrageenan | 0.9 |
| Carboxymethyl cellulose | 0.9 |
| Dried egg whites | 3.0 |
| Salt | 2.0 |
| Chemical leavening[2] | 10.0 |
| Dough conditioner[3] | 0.6 |

[1] All Trumps ®; a high gluten (14.7%) mixed wheat and barley enriched flour sold by General Mills, Inc.
[2] 2 parts glucono-delta-lactone and 1 part sodium bicarbonate.
[3] 2 parts calcium stearoyl-2-lactylate and 1 part sodium stearoyl-2-lactylate A bread was prepared by adding hot water (120° F., 150 ml.) to 165 g. of the bread mix and mixed with a spoon for two minutes. The dough was transferred to a bread pan (4 in. × 6 in.), shaped to smooth the surface, proofed for five min. at room temp., and baked at 375° F. for 25 minutes.

Both volume and cohesiveness were measured. The volume was determined to be 935 cc. (a specific volume of 5.6 cc./g. of dry mix) and the cohesiveness was determined to be 0.66.

A bread mix of identical composition is prepared except for replacement of the carrageenan for an equal amount of guar gum. The resultant baked bread has a volume of 975 cc. and a cohesivity value of 0.64.

EXAMPLE II

A bread mix of the present invention is prepared having the following composition.

| Ingredients | Parts by Weight |
| --- | --- |
| Flour | 100.0 |
| 30 parts rye | |
| 70 parts high gluten wheat flour[1] | |
| Active dry yeast | 4.0 |
| Sodium bicarbonate | 2.0 |
| Baking acid | 3.0 |
| Propylene glycol alginate | 1.4 |
| Karaya gum | 1.0 |
| Guar gum | 0.5 |

[1] All Trumps ®

EXAMPLE III

A master batch was prepared having the following formulation:

| Ingredients | Parts by Weight |
| --- | --- |
| Flour[1] | 100.0 |
| Active dry yeast | 5.0 |
| Non-fat dry milk | 6.0 |
| Sugar | 2.0 |
| Salt | 2.0 |
| Leavening[2] | 10.0 |
| Dough conditioner[3] | 0.6 |

[1] All Trumps ®
[2] 2 parts glucono-delta-lactone and 1 part sodium bicarbonate
[3] 2 parts calcium stearoyl-2-lactylate and 1 part sodium stearoyl-2-lactylate For comparison, bread replicates were prepared with 165 g. of the master batch dry mix and spoon mixed with 150 ml. of hot water (120° F.) in a bowl for five minutes The dough was transferred to a bread pan (4"×6"), shaped, proofed for 5 minutes at room temperature (68° F.) and baked at 375° F. for 25 minutes. After overnight storage the average (5) volume and cohesiveness of the control measured were:

| | |
| --- | --- |
| Volume | 725 cc. |
| Cohesiveness | 0.37 |
| Specific volume | 4.39 cc./g. |

The importance of the gum mixture comprising propylene glycol alginate and selected gums was shown by adding various gum combinations to a master blend of 165 g.

The averaged results of such testing are given in Table I below:

TABLE I

| Gum | Volume (cc) | Cohesiveness | Specific Volume |
| --- | --- | --- | --- |
| (1) PGA 0.9 parts<br>Carboxymethyl cellulose 0.9 parts<br>Xanthan 0.9 parts<br>Carrageenan 0.9 parts | 935 | 0.66 | 5.66 |
| (2) PGA 0.9 parts<br>Guar 0.9 parts<br>Carboxymethyl cellulose 0.9 parts<br>Xanthan 0.9 parts | 975 | 0.64 | 5.90 |
| (3) PGA 0.9 parts<br>Xanthan 0.9 parts<br>Carrageenan 0.9 parts<br>Guar 0.9 parts | 950 | 0.68 | 5.75 |
| (4) PGA 0.9 parts<br>Carboxymethyl cellulose 0.9 parts<br>Carrageenan 0.9 parts<br>Guar 0.9 parts | 1025 | 0.69 | 6.21 |

As can be seen from the above Table I, dry mixes of the present invention containing PGA within the essential range in combination with a second gum(s) within the essential range produce finished baked breads which exhibit both increased volume and thus high specific volumes as well as a desirable cohesiveness compared to the control.

For comparison, breads containing PGA alone or in combination with the other gums were prepared from a master blend having the same formulation as above. The results of this testing is given in Table II below.

TABLE II

| Gum | Volume (cc) | Cohesiveness | Specific Volume |
|---|---|---|---|
| (1) PGA | | | |
| 2 parts | 933 | 0.786 | 5.65 |
| 4 parts | 983 | 0.82 | 5.96 |
| (2) Karaya | | | |
| 2 parts | 775 | 0.50 | 4.69 |
| 4 parts | 775 | 0.56 | 4.71 |
| (3) Xanthan | | | |
| 2 parts | 750 | 0.49 | 4.54 |
| 4 parts | 650 | 0.51 | 3.93 |
| (4) Guar | | | |
| 2 parts | 875 | 0.51 | 5.30 |
| 4 parts | 850 | 0.50 | 5.15 |
| (5) CMC | | | |
| 2 parts | 1025 | 0.54 | 6.21 |
| 4 parts | 1000 | 0.59 | 6.06 |
| (6) Carrageenan | | | |
| 2 parts | 950 | 0.52 | 5.75 |
| 4 parts | 1000 | 0.58 | 6.06 |
| (7) Mixture[1] | | | |
| 2 parts | 925 | 0.54 | 5.60 |
| 4 parts | 900 | 0.60 | 5.45 |
| (8) PGA and Karaya | | | |
| 2 parts | 925 | 0.74 | 5.60 |
| (9) PGA and Xanthan | | | |
| 2 parts | 750 | 0.72 | 4.54 |
| (10) PGA and Guar | | | |
| 2 parts | 1050 | 0.79 | 6.36 |
| (11) PGA and CMC | | | |
| 2 parts | 1075 | 0.76 | 6.51 |
| (12) PGA and Carrageenan | | | |
| 2 parts | 1000 | 0.78 | 6.06 |
| (13) PGA 2 parts Karaya and CMC 1 part | 925 | 0.79 | 5.60 |

[1]Mixture of equal proportion of gum Karaya, CMC, carrageenan, xanthan gum and guar gum.

As can be seen from the above Table II, dry mixes containing excessive amounts of PGA in combination with a second gum(s) within the essential range produce finished baked breads which fail to exhibit both desirable volume and a desirable cohesiveness value.

What is claimed is:

1. A dry mix for preparing bread without requiring a kneading step, said mix comprising:
   A. flour having an average vital gluten content of at least about 8% by weight;
   B. about 2 parts to 10 parts by weight of active dry yeast per 100 parts flour;
   C. about 1 part to 10 parts by weight of a chemical leavening agent per 100 parts flour;
   D. 0.5 to 1.5 parts by weight per 100 parts of flour of a propylene glycol alginate; and
   E. about 2 parts to 10 parts of a gum member by weight per 100 parts flour selected from the group consisting of karaya gum, guar gum, xanthan gum, high viscosity carboxymethyl cellulose, high viscosity carrageenan gum, and mixtures thereof.

2. The dry mix of claim 1, wherein the gum member is selected from the group consisting of karaya gum, high viscosity carboxymethyl cellulose, guar gum, and mixtures thereof.

3. The dry mix of claim 2 wherein the propylene glycol alginate is present at from about 0.8 parts to 1.2 parts per 100 parts flour.

4. The dry mix of claim 3 wherein the gum member is present at from about 2 parts to 5 parts per 100 parts flour.

5. The dry mix of claim 4 wherein the active dry yeast is present at from about 4 parts to 6 parts per 100 parts flour.

6. The dry mix of claim 5 additionally comprising from about 1 part to 10 parts of shortening per 100 parts flour.

7. The dry mix of claim 6 additionally comprising fom about 1 part to 10 parts of high heat non-fat dry milk solids.

* * * * *